United States Patent
Rajagopalan et al.

(10) Patent No.: US 11,902,144 B1
(45) Date of Patent: Feb. 13, 2024

(54) PRESERVING CONSISTENCY OF REDUNDANT BORDER GATEWAY PROTOCOL LINK STATE TOPOLOGY INFORMATION

(71) Applicant: Juniper Networks, Inc., Sunnyvale, CA (US)

(72) Inventors: Balaji Rajagopalan, Bangalore (IN); Jeyananth Minto Jeganathan, Pleasanton, CA (US); Tarek Saad, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

(21) Appl. No.: 17/540,543

(22) Filed: Dec. 2, 2021

(51) Int. Cl.
  *H04L 45/02* (2022.01)
  *H04L 45/00* (2022.01)
(52) U.S. Cl.
  CPC ............ *H04L 45/02* (2013.01); *H04L 45/04* (2013.01); *H04L 45/22* (2013.01)
(58) Field of Classification Search
  None
  See application file for complete search history.

(56) References Cited

U.S. PATENT DOCUMENTS

| | | | |
|---|---|---|---|
| 9,660,897 B1 * | 5/2017 | Gredler | H04L 45/50 |
| 9,912,577 B2 * | 3/2018 | Filsfils | H04L 45/04 |
| 2016/0248658 A1 * | 8/2016 | Patel | H04L 45/48 |
| 2019/0372858 A1 * | 12/2019 | Krishnamurthy | H04L 41/145 |

FOREIGN PATENT DOCUMENTS

| | | |
|---|---|---|
| EP | 3820089 A1 | 5/2021 |
| WO | 2020072778 A1 | 4/2020 |

OTHER PUBLICATIONS

Extended European Search Report for Application No. EP22210907.6, dated Apr. 26, 2023, 10 pages.
Raszuk et al., "Distribution of Diverse BGP Paths," Internet Engineering Task Force (IETF), RFC 6774, Nov. 2012, 22 Pages.
Uttaro et al., "Best Practices for Advertisement of Multiple Paths in IBGP draft-ietf-idr-add-paths-guidelines-08.txt," IDR Working Group, Apr. 25, 2016, 25 Pages.

* cited by examiner

*Primary Examiner* — Xavier S Wong
(74) *Attorney, Agent, or Firm* — Harrity & Harrity, LLP

(57) ABSTRACT

A device may receive first topology information from a first network device of a network, and may receive second topology information from a second network device of the network. The device may assign a first BGP-LS identifier to the first network device, and may associate the first topology information with the first BGP-LS identifier. The device may assign a second BGP-LS identifier to the second network device, and may associate the second topology information with the second BGP-LS identifier. The device may store the first topology information, as a first route, based on the first BGP-LS identifier, and may store the second topology information, as a second route, based on the second BGP-LS identifier. The device may select the first route or the second route as a primary route, and may utilize the primary route to control routing of traffic through the network.

20 Claims, 9 Drawing Sheets

PRESERVING CONSISTENCY OF REDUNDANT BORDER GATEWAY PROTOCOL LINK STATE TOPOLOGY INFORMATION

BACKGROUND

The border gateway protocol (BGP) is a standardized exterior gateway protocol designed to exchange routing and reachability information among network devices. BGP is classified as a path-vector routing protocol that makes routing decisions based on paths, network policies, rule-sets, and/or the like.

SUMMARY

Some implementations described herein relate to a method. The method may include receiving first topology information from a first network device of a network, and receiving second topology information, different than the first topology information, from a second network device of the network. The method may include assigning a first BGP link state (BGP-LS) identifier to the first network device, and associating the first topology information with the first BGP-LS identifier. The method may include assigning a second BGP-LS identifier, different than the first BGP-LS identifier, to the second network device, and associating the second topology information with the second BGP-LS identifier. The method may include storing, in a data structure, the first topology information, as a first route, based on the first BGP-LS identifier, and storing, in the data structure, the second topology information, as a second route different than the first route, based on the second BGP-LS identifier. The method may include selecting the first route or the second route as a primary route based on features associated with the first route and the second route, and utilizing the primary route to control routing of traffic through the network.

Some implementations described herein relate to a device. The device may include one or more memories and one or more processors. The one or more processors may be configured to receive first topology information from a first network device of a network, and receive second topology information, different than the first topology information, from a second network device of the network. The one or more processors may be configured to assign a first BGP-LS identifier to the first network device, and associate the first topology information with the first BGP-LS identifier. The one or more processors may be configured to assign a second BGP-LS identifier, different than the first BGP-LS identifier, to the second network device, and associate the second topology information with the second BGP-LS identifier. The one or more processors may be configured to store, in a data structure, the first topology information, as a first route, based on the first BGP-LS identifier, and store, in the data structure, the second topology information, as a second route different than the first route, based on the second BGP-LS identifier. The one or more processors may be configured to select the first route or the second route as a primary route based on features associated with the first route and the second route. The features associated with the first route and the second route may include data identifying one or more of a first distance between the device and the first network device, a second distance between the device and the second network device, an age of the first route, an age of the second route, a credibility of the first network device, or a credibility of the second network device. The one or more processors may be configured to utilize the primary route to control routing of traffic through the network.

Some implementations described herein relate to a non-transitory computer-readable medium that stores a set of instructions for a device. The set of instructions, when executed by one or more processors of the device, may cause the device to receive first topology information from a first network device of a network, and receive second topology information, different than the first topology information, from a second network device of the network. The set of instructions, when executed by one or more processors of the device, may cause the device to assign a first border gateway protocol link state (BGP-LS) identifier to the first network device, and associate the first topology information with the first BGP-LS identifier. The set of instructions, when executed by one or more processors of the device, may cause the device to assign a second BGP-LS identifier, different than the first BGP-LS identifier, to the second network device, and associate the second topology information with the second BGP-LS identifier. The set of instructions, when executed by one or more processors of the device, may cause the device to store, in a data structure, the first topology information, as a first route, based on the first BGP-LS identifier, and store, in the data structure, the second topology information, as a second route different than the first route, based on the second BGP-LS identifier. The set of instructions, when executed by one or more processors of the device, may cause the device to select the first route or the second route as a primary route based on features associated with the first route and the second route, and utilize the primary route to control routing of traffic through the network. The set of instructions, when executed by one or more processors of the device, may cause the device to provide, to a peer device, the first topology information or the second topology information, based on whether the first route or the second route is selected as the primary route, to cause the peer device to utilize the first topology information or the second topology information to control routing of traffic through the network.

DETAILED DESCRIPTION

Figure 1A:
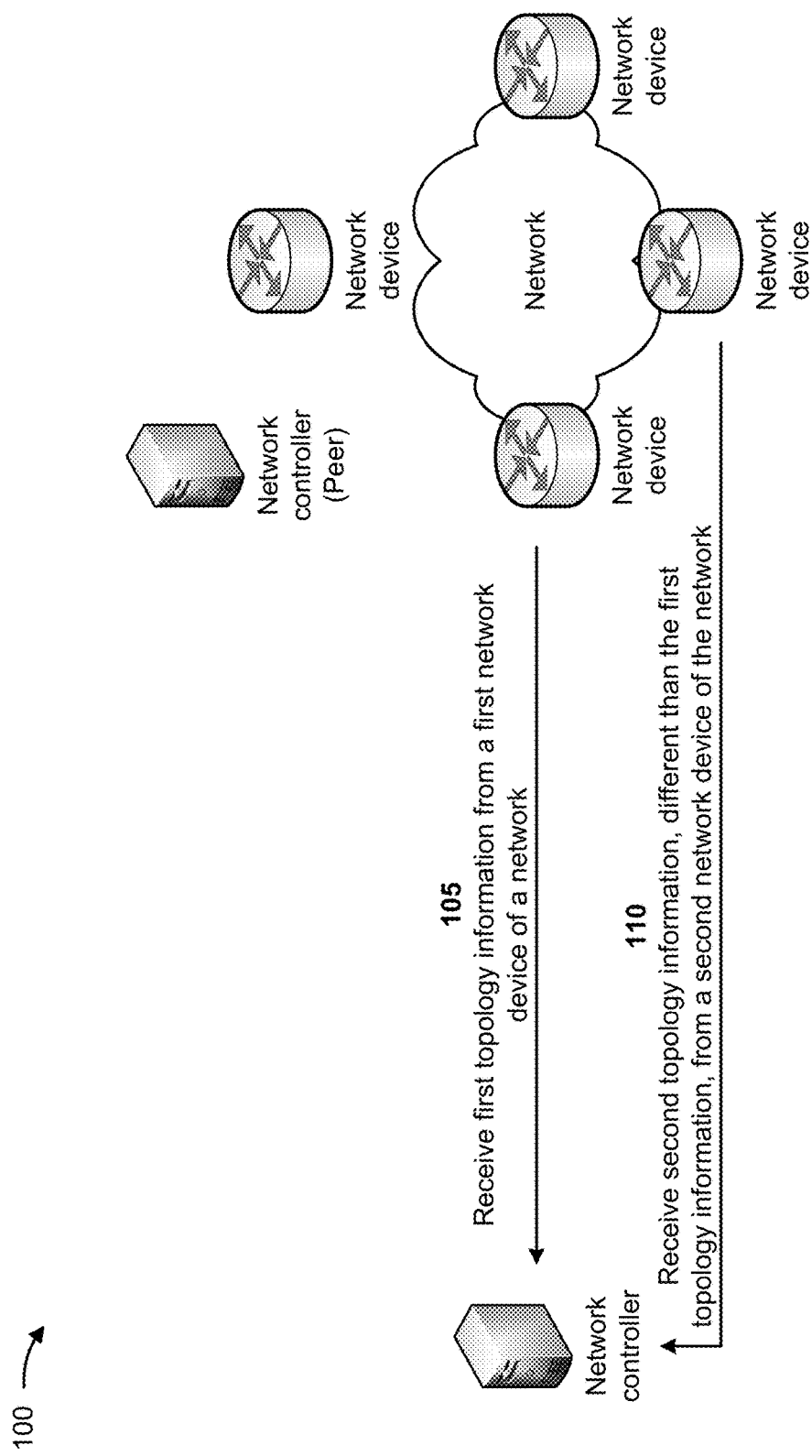
FIGS. 1A-1E are diagrams of an example associated with preserving consistency of redundant BGP link state (BGP-LS) topology information.

The following detailed description of example implementations refers to the accompanying drawings. The same reference numbers in different drawings may identify the same or similar elements.

BGP-link state (BGP-LS) is a BGP protocol extension that carries topology information. In BGP-LS, network devices and links are represented with network layer reachability information (NLRI), which typically translates into routes in a routing information base (RIB). The topology information is subject to a same set of rules that are applied to routes in the RIB. If the same topology information is received from two different network devices, one of the topology information is designated as an active route. The active route is what is used for propagation to other network devices of a network. However, if a BGP consumer (e.g., a network controller) receives topology information for the same network from more than one network device (e.g., which may be performed for redundancy), some challenges may arise. For example, if a link gets deleted from first topology information received from a first network device, but is not deleted from second topology information received from a second network device, the BGP consumer may utilize the unsuccessfully deleted link for routing decisions since BGP consumer may determine that the link is still active. Therefore, entries from two different BGP originators (e.g., network devices) may get mixed up, leading to an inconsistent view of the network. This condition will persist until the second network device also successfully deletes the link from the second topology information.

Thus, current techniques for handling BGP-LS topology information consume computing resources (e.g., processing resources, memory resources, communication resources, and/or the like), networking resources, and/or the like, associated with incorrectly handling network traffic based on an inconsistent view of a network, waiting a maximum of convergence times of all BGP originators to correct the inconsistent view of the network, dropping traffic due to the inconsistent view of the network, and/or the like.

Some implementations described herein relate to a network controller that preserves consistency of redundant BGP-LS topology information. For example, a network controller may receive first topology information from a first network device of a network, and may receive second topology information, different than the first topology information, from a second network device of the network. The network controller may assign a first BGP-LS identifier to the first network device, and may associate the first topology information with the first BGP-LS identifier. The network controller may assign a second BGP-LS identifier, different than the first BGP-LS identifier, to the second network device, and may associate the second topology information with the second BGP-LS identifier. The network controller may store, in a data structure, the first topology information, as a first route, based on the first BGP-LS identifier, and may store, in the data structure, the second topology information, as a second route different than the first route, based on the second BGP-LS identifier. The network controller may select the first route or the second route as a primary route based on features associated with the first route and the second route, and may utilize the primary route to control routing of traffic through the network.

In this way, the network controller preserves consistency of redundant BGP-LS topology information. For example, the network controller may receive and store topology information from the two network devices (e.g., BGP originators) as two different routes. The network controller may utilize a BGP-LS identifier field to assign a different BGP-LS identifier to each BGP originator of the topology information. Since the BGP-LS identifier is part of the NLRI, and therefore a route, the topology information of each BGP originator is stored as a different route. This may reduce the maximum convergence time to a convergence time of a single BGP originator. Thus, the network controller conserves computing resources, networking resources, and/or the like that would otherwise have been consumed by incorrectly handling network traffic based on an inconsistent view of a network, waiting a maximum of convergence times of all BGP originators to correct the inconsistent view of the network, dropping traffic due to the inconsistent view of the network, and/or the like.

FIGS. 1A-1E are diagrams of an example 100 associated with preserving consistency of redundant BGP-LS topology information. As shown in FIGS. 1A-1E, example 100 includes a network controller (e.g., a BGP consumer or a path computation element), a peer network controller (e.g., a BGP consumer or a path computation element), and a network with a plurality of network devices (e.g., BGP sources or originators). Further details of the network controllers, the network, and the network devices are provided elsewhere herein. Although implementations are described in connection with the network controller, the functionality of the network controller may be performed by one or more of the network devices.

As shown in FIG. 1A, and by reference number 105, the network controller may receive first topology information from a first network device of the network. For example, the first network device may identify a path through the network and may generate the first topology information based on the identified path. In some implementations, the first topology information may include network layer reachability information that represents network devices and links of the path (e.g., a route though the network). For example, the first topology information may indicate that the path includes the first network device, the second network device, a third network device, a first link provided between the first network device and the second network device, and a second link provided between the second network device and the third network device. The first network device may provide the first topology information to the network controller, and the network controller may receive the first topology information.

As further shown in FIG. 1A, and by reference number 110, the network controller may receive second topology information, different than the first topology information, from a second network device of the network. For example, the second network device may also identify the same path through the network, as identified by the first network device, and may generate the second topology information based on the identified path. In some implementations, the second topology information may include network layer reachability information that represents network devices and links of the path (e.g., the route though the network). However, the second topology information may indicate that the path includes the first network device, the second network device, a fourth network device (e.g., rather than the third network device), the first link provided between the first network device and the second network device, and a third link (e.g., rather than the second link) provided between the second network device and the fourth network device. The second network device may provide the second topology information to the network controller, and the network controller may receive the second topology information. Although implementations are described in connection with two topology feeds, the implementations may be utilized with more than two topology feeds, such as third topology information, fourth topology information, and/or the like.

Figure 1B:
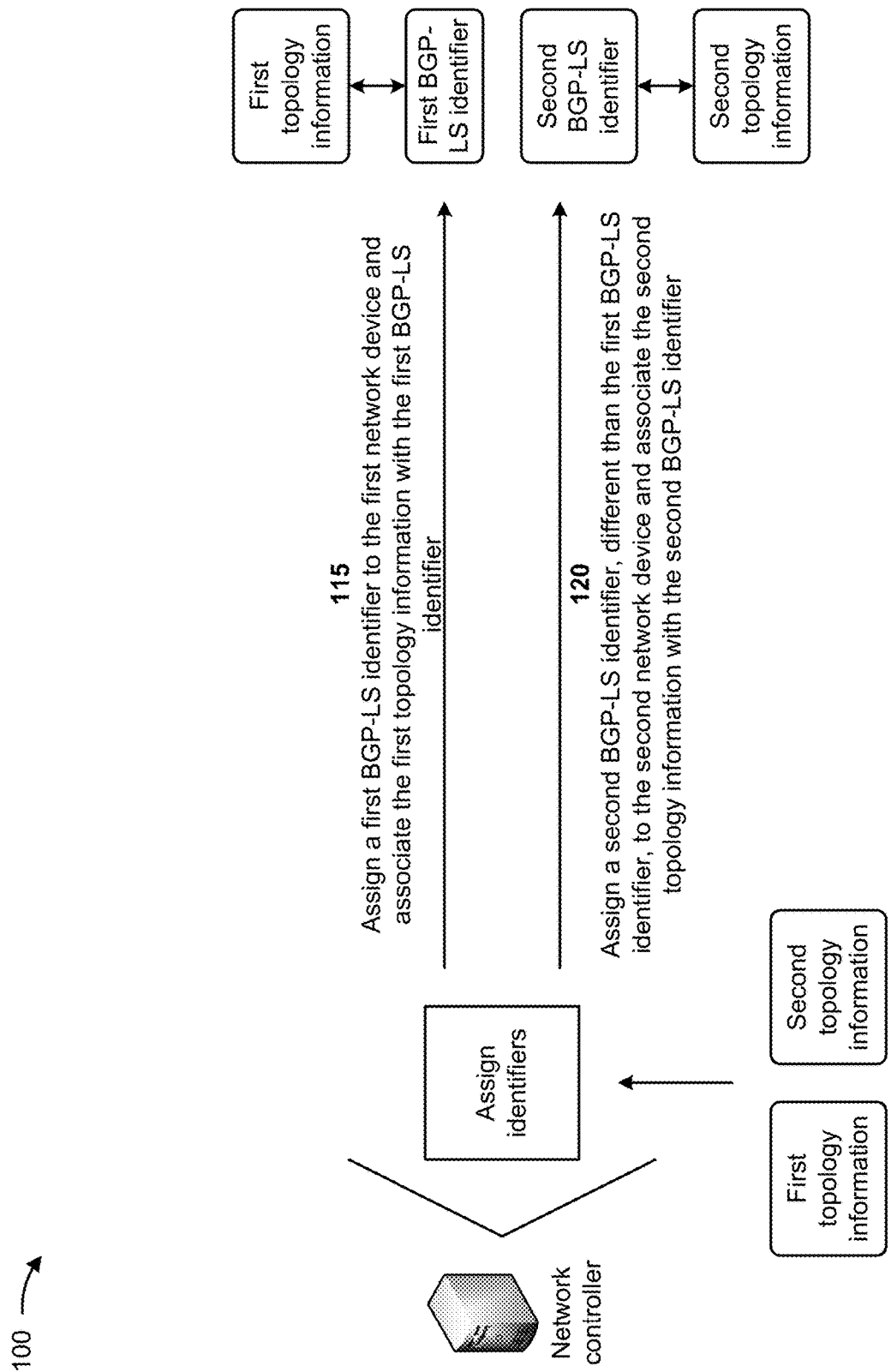

As shown in FIG. 1B, and by reference number 115, the network controller may assign a first BGP-LS identifier to the first network device and may associate the first topology information with the first BGP-LS identifier. For example, the network controller may utilize a BGP-LS identifier field to identify an originator of topology information, where each originator of the topology information is assigned a different BGP-LS identifier. Since the BGP-LS identifier is part of network layer reachability information, and therefore a route, each originator's topology information may be associated with a different route. In some implementations, the network controller may assign the first BGP-LS identifier to the first network device (e.g., the originator of the first topology information), and then may associate the first topology information with the first BGP-LS identifier. Although a BGP-LS identifier may be the same for topology information arriving from a same network domain, the network controller may configure different BGP-LS identifiers for different network devices in the same network domain. In some implementations, rather than utilizing the BGP-LS identifier, a new protocol field identifier (e.g., identifying an originator of topology information) may be added to the network layer reachability information. In such implementations, the network controller may assign a first new protocol field identifier to the first network device, and then may associate the first topology information with the first new protocol field identifier.

As further shown in FIG. 1B, and by reference number 120, the network controller may assign a second BGP-LS identifier to the second network device and may associate the second topology information with the second BGP-LS identifier. For example, the network controller may assign the second BGP-LS identifier to the second network device (e.g., the originator of the second topology information), and then may associate the second topology information with the second BGP-LS identifier. Although a BGP-LS identifier may be the same for topology information arriving from a same network domain, the second BGP-LS identifier (e.g., which identifies the second network device) may be different than the first BGP-LS identifier (e.g., which identifies the first network device). In some implementations, rather than utilizing the BGP-LS identifier, the new protocol field identifier may be added to the network layer reachability information. In such implementations, the network controller may assign a second new protocol field identifier to the second network device, and then may associate the second topology information with the second new protocol field identifier. The second new protocol field identifier may be different than the first new protocol field identifier, described above. In some implementations, the first BGP-LS identifier may include a first value, and the second BGP-LS identifier may include a second value that is different than the first value.

In some implementations, the network controller may execute a configuration to cause the network controller to assign the first BGP-LS identifier to the first network device and to assign the second BGP-LS identifier, different than the first BGP-LS identifier, to the second network device. In this way, the network controller may disregard the assumption that a BGP-LS identifier is to be the same for topology information arriving from different originators located in the same network domain.

In some implementations, topology information from different originators pass through a route reflector before being provided to the network controller, the topology information may be stored as different routes in a routing information base (RIB). In such implementations, the topology information from the different originator may reach the network controller through the route reflector, as long as each originator is associated with a different BGP-LS identifier. Otherwise, the route reflector may not provide different routes (e.g., via the topology information to the network controller. Rather, the route reflector may select a route and may provide the selected route (e.g., topology information) to the network controller.

Figure 1C:
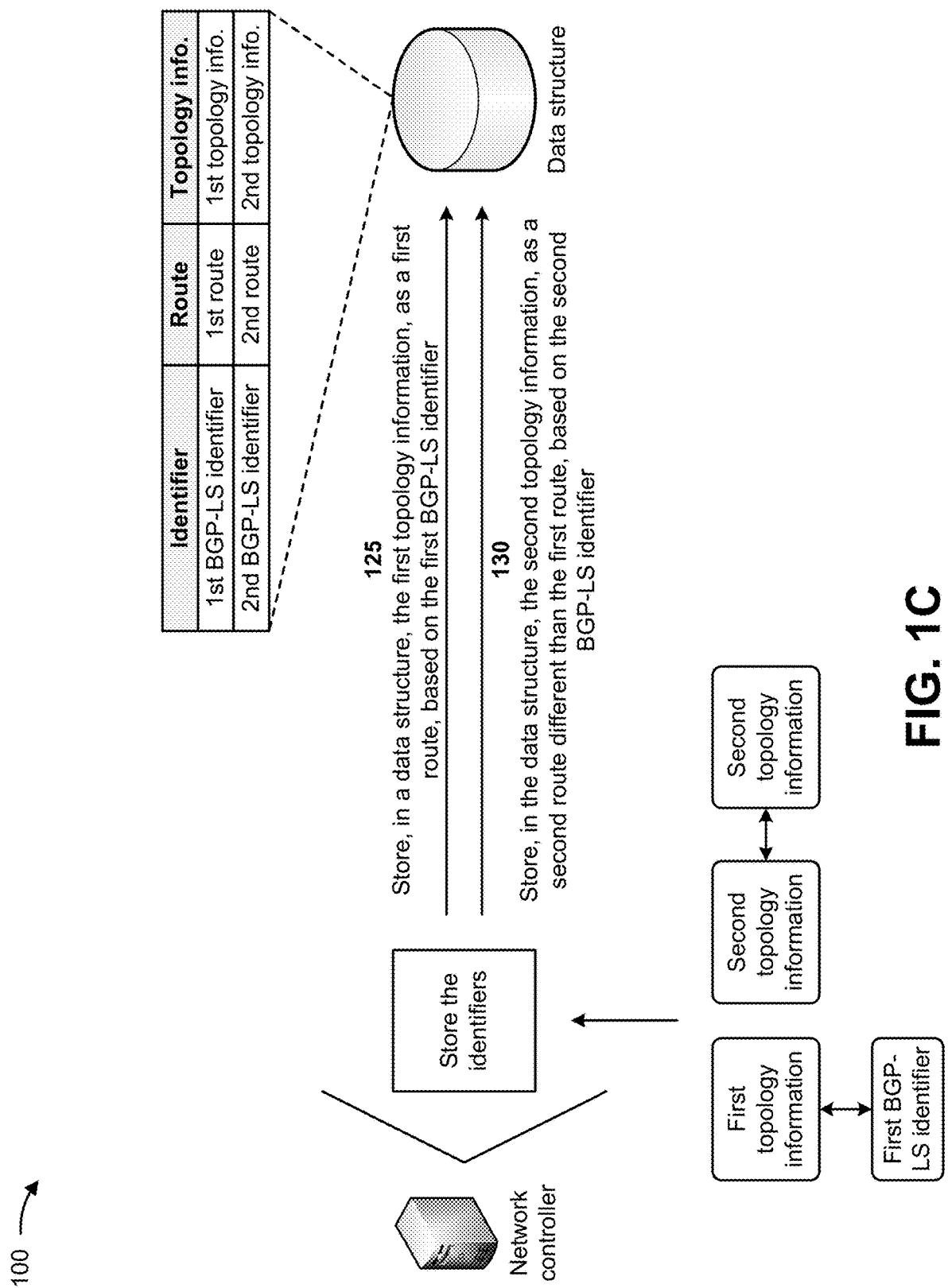

As shown in FIG. 1C, and by reference number 125, the network controller may store, in a data structure, the first topology information, as a first route, based on the first BGP-LS identifier. For example, the network controller may categorize each BGP-LS identifier as a separate originator of topology information when storing the topology information in a data structure, such as a traffic engineering database. Thus, the network controller may store the first topology information, as the first route, in the data structure based on the first BGP-LS identifier. In some implementations, the data structure store topology information (e.g., for the same network) from multiple originators and may distinguish among the originators (e.g., to handle a dual interior gateway protocol (IGP) in the same network).

As further shown in FIG. 1C, and by reference number 130, the network controller may store, in the data structure, the second topology information, as a second route different than the first route, based on the second BGP-LS identifier. For example, the network controller may determine that the second BGP-LS identifier is associated with a separate originator (e.g., the second network device) of topology information than an originator (e.g., the first network device) of topology information associated with the first BGP-LS identifier. Thus, the network controller may store the second topology information, as the second route, in the data structure based on the second BGP-LS identifier. In some implementations, the second route (e.g., which includes the fourth network device and the third link, but does not include the third network device and the second link) is different than the first route (e.g., which includes the third network device and the second link, but does not include the fourth network device and the third link). As further shown in FIG. 1C, the data structure may include an identifier field that stores the first BGP-LS identifier and the second BGP-LS identifier, a route field that stores the first route and the second route, and a topology information field that stores the first topology information (e.g., associated with the first BGP-LS identifier and the first route) and the second topology information (e.g., associated with the second BGP-LS identifier and the second route).

Figure 1D:
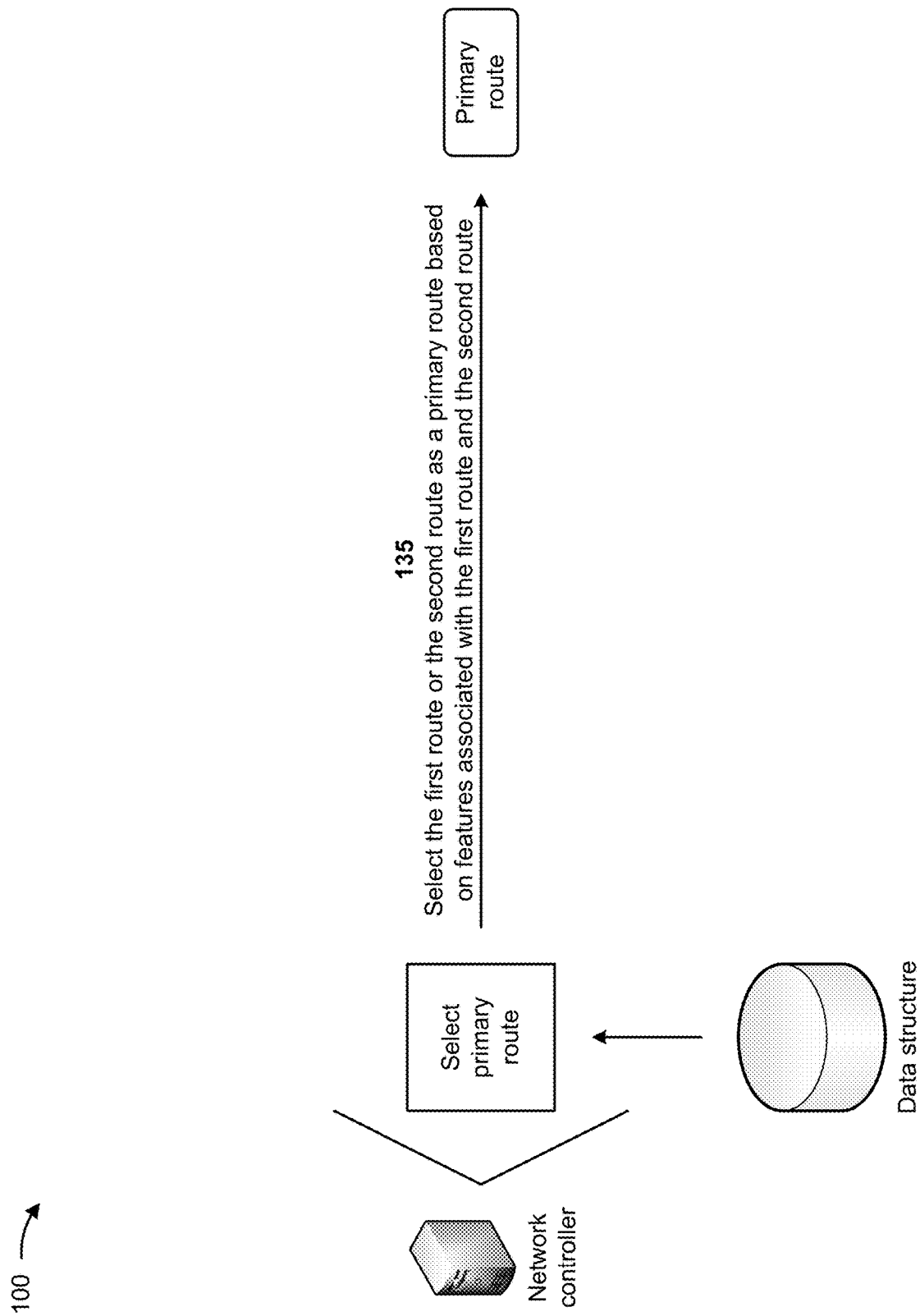

As shown in FIG. 1D, and by reference number 135, the network controller may select the first route or the second route as a primary route based on features associated with the first route and the second route. For example, the network controller may analyze the features associated with the first route and the second route, and may determine which of the first route or the second provides a preferred route through the network based on analyzing the features. In some implementations, the features associated with the first route and the second route may include data identifying a first distance between the network controller and the first network device, a second distance between the network controller and the second network device, an age of the first route, an age of the second route, a credibility of the first network device, a credibility of the second network device, and/or the like. For example, the network controller may assign a higher credibility score to the first network device than to the second network device since the network controller has received accurate topology information from the first network device in the past. In such an example, the network controller may select the first route as the primary route based on the higher credibility allotted to the first network device. In another example, the network controller may determine that the second route is newer than the first route since the second route was received after the first route was received. In such an example, the network controller may select the second route as the primary route based on the age (e.g., newer) of the second route.

In some implementations, when selecting the first route or the second route as the primary route based on the features associated with the first route and the second route, the network controller may select the first route or the second route as the primary route based on convergence times associated with the first route and the second route. For example, the network controller may determine that a convergence time associated with the first route is less than a convergence time associated with the second route. In such an example, the network controller may select the first route as the primary route. Convergence is a state of a set of network devices that include the same topology information about the network.

Figure 1E:
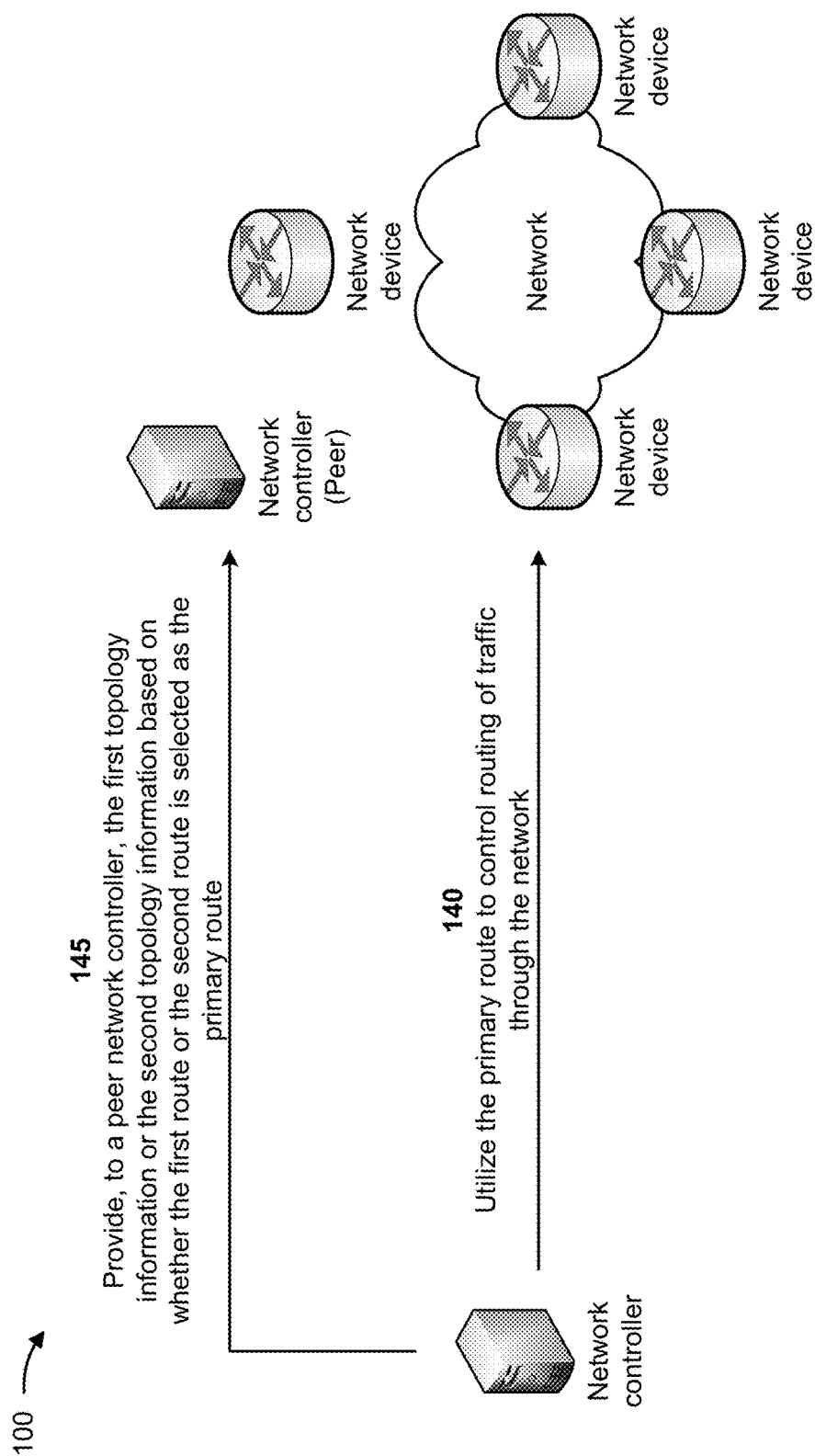

As shown in FIG. 1E, and by reference number 140, the network controller may utilize the primary route to control routing of traffic through the network. For example, when utilizing the primary route to control the routing of the traffic through the network, the network controller may provide the first topology information to the network to cause the network to route the traffic through the network via the first route (e.g., when the first route is selected as the primary route), may provide the second topology information to the network to cause the network to route the traffic through the network via the second route (e.g., when the second route is selected as the primary route), and/or the like.

As further shown in FIG. 1E, and by reference number 145, the network controller may provide, to a peer network controller, the first topology information or the second topology information based on whether the first route or the second route is selected as the primary route. For example, the network controller may provide, to the peer network controller, the first topology information when the first route is selected as the primary route, the second topology information when the second route is selected as the primary route, and/or the like. In some implementations, the peer device may utilize the first topology information or the second topology information to control routing of traffic through the network. For example, the peer network controller may provide the first topology information to the network to cause the network to route the traffic through the network via the first route (e.g., when the first topology information is received from the network controller), may provide the second topology information to the network to cause the network to route the traffic through the network via the second route (e.g., when the second topology information is received from the network controller), and/or the like.

In this way, the network controller preserves consistency of redundant BGP-LS topology information. For example, the network controller may receive and store topology information from the two network devices (e.g., BGP originators) as two different routes. The network controller may utilize a BGP-LS identifier field to assign a different BGP-LS identifier to each BGP originator of the topology information. Since the BGP-LS identifier is part of the NLRI, and therefore a route, the topology information of each BGP originator is stored as a different route. This may reduce the maximum convergence time to a convergence time of a single BGP originator. Thus, the network controller conserves computing resources, networking resources, and/or the like that would otherwise have been consumed by incorrectly handling network traffic based on an inconsistent view of a network, waiting a maximum of convergence times of all BGP originators to correct the inconsistent view of the network, dropping traffic due to the inconsistent view of the network, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
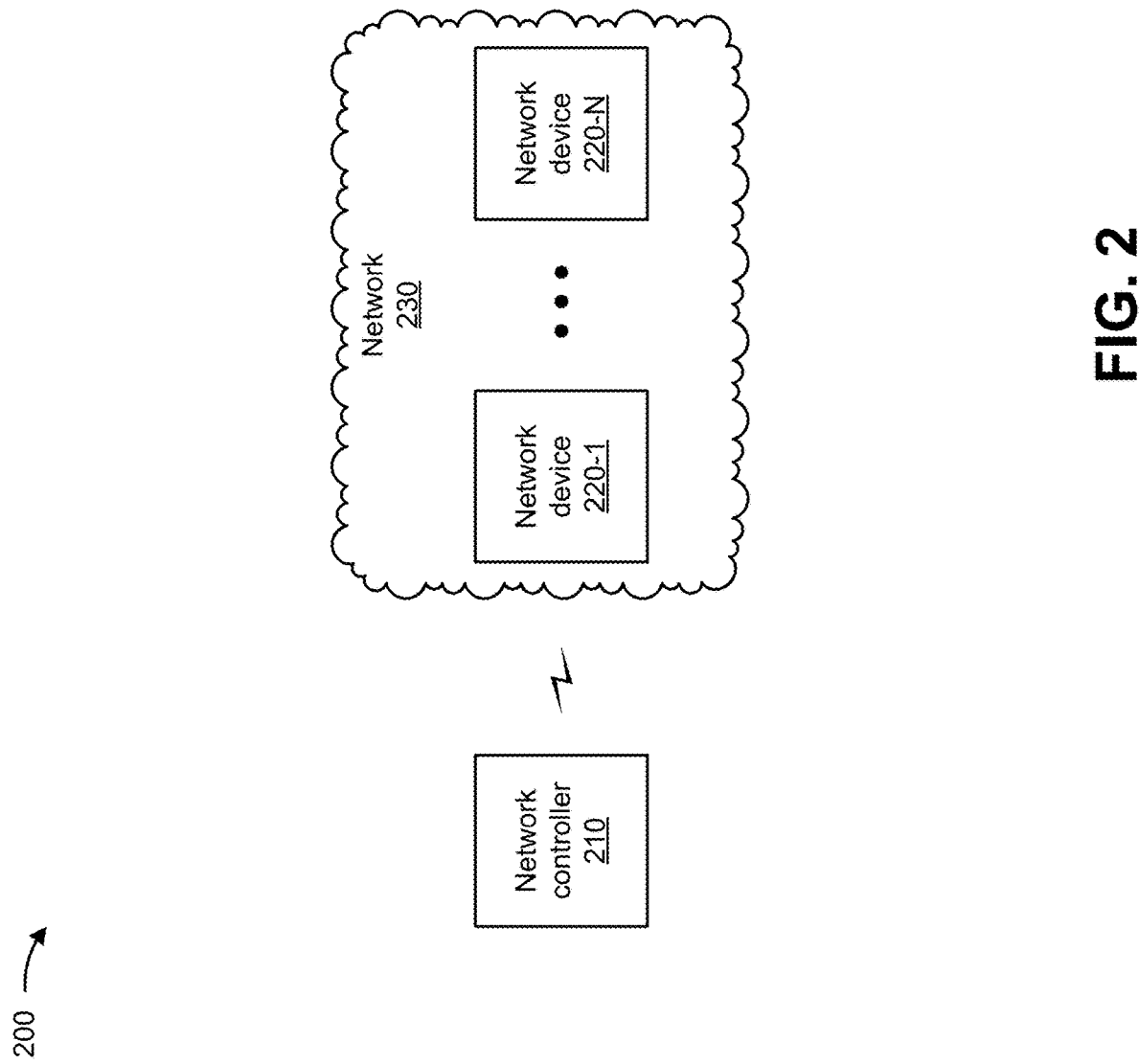
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network controller 210, a group of network devices 220 (shown as network device 220-1 through network device 220-N), and a network 230. Devices of the environment 200 may interconnect via wired connections, wireless connections, or a combination of wired and wireless connections.

The network controller 210 includes one or more devices capable of receiving, generating, storing, processing, providing, and/or routing information, as described elsewhere herein. The network controller 210 may include a communication device and/or a computing device. For example, the network controller 210 may include a server, such as an application server, a client server, a web server, a database server, a host server, a proxy server, a virtual server (e.g., executing on computing hardware), or a server in a cloud computing system. In some implementations, the network controller 210 includes computing hardware used in a cloud computing environment.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
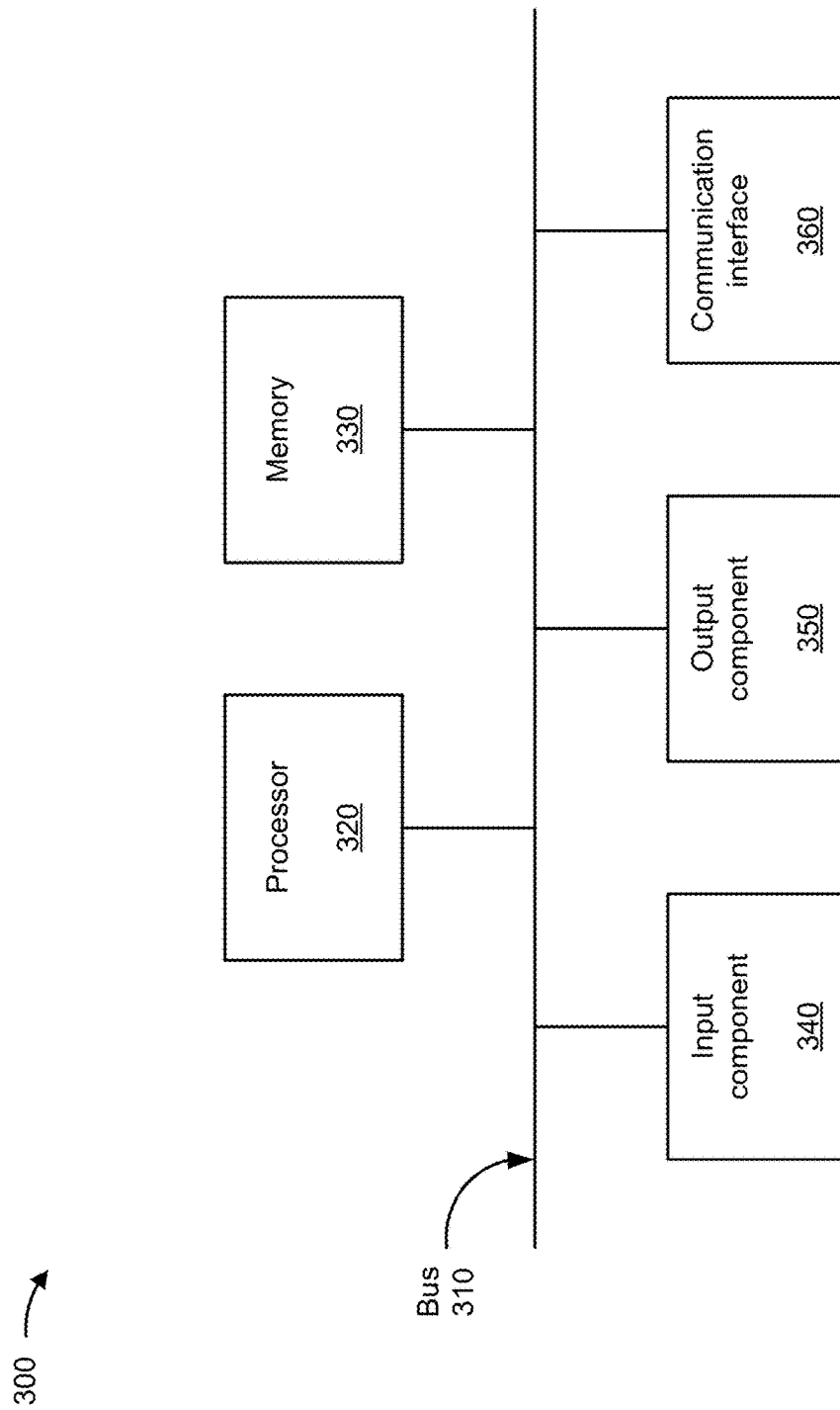
FIGS. 3 and 4 are diagrams of example components of one or more devices of FIG. 2.

FIG. 3 is a diagram of example components of one or more devices of FIG. 2. The example components may be included in a device 300, which may correspond to the network controller 210 and/or the network device 220. In some implementations, the network controller 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
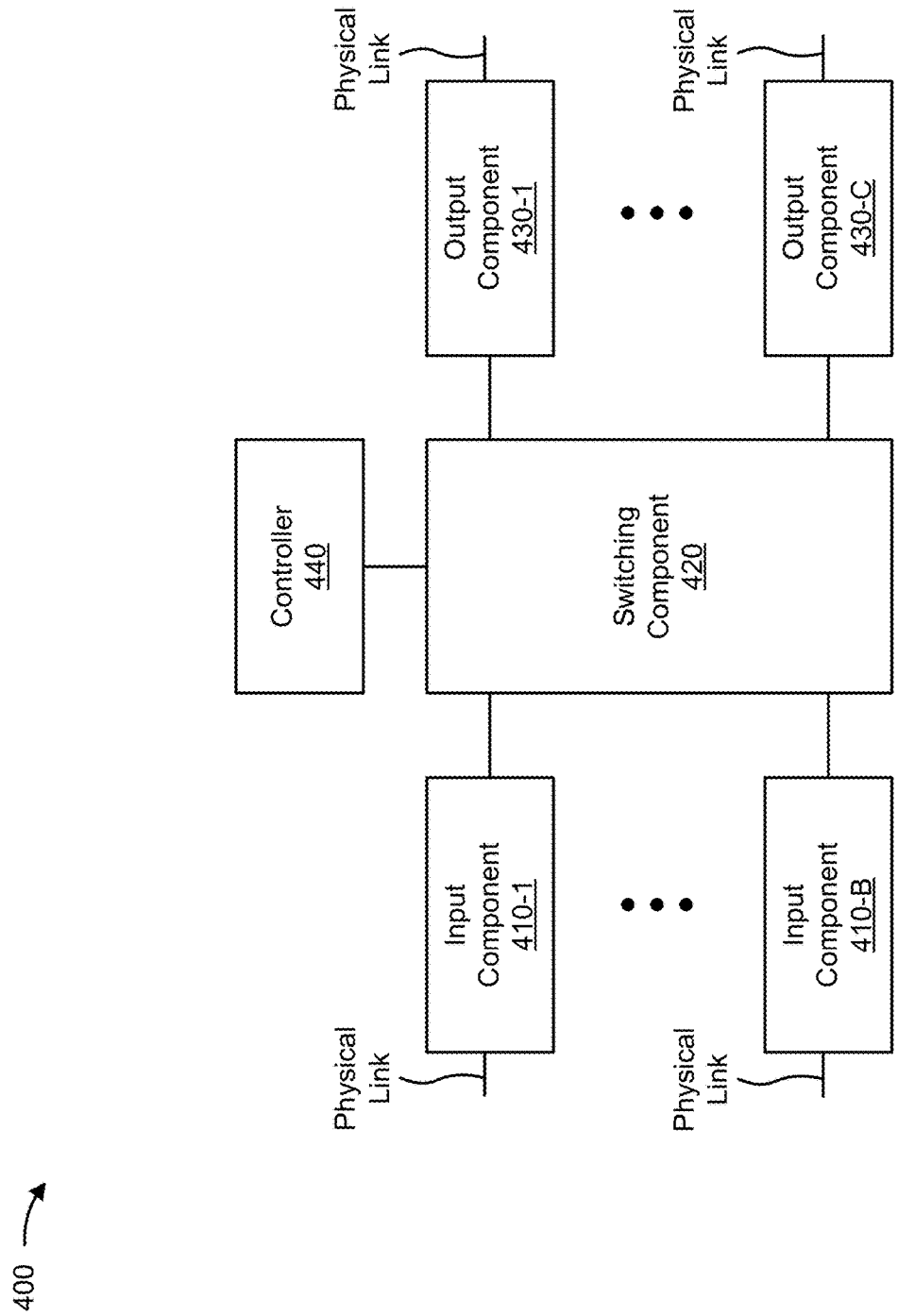

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
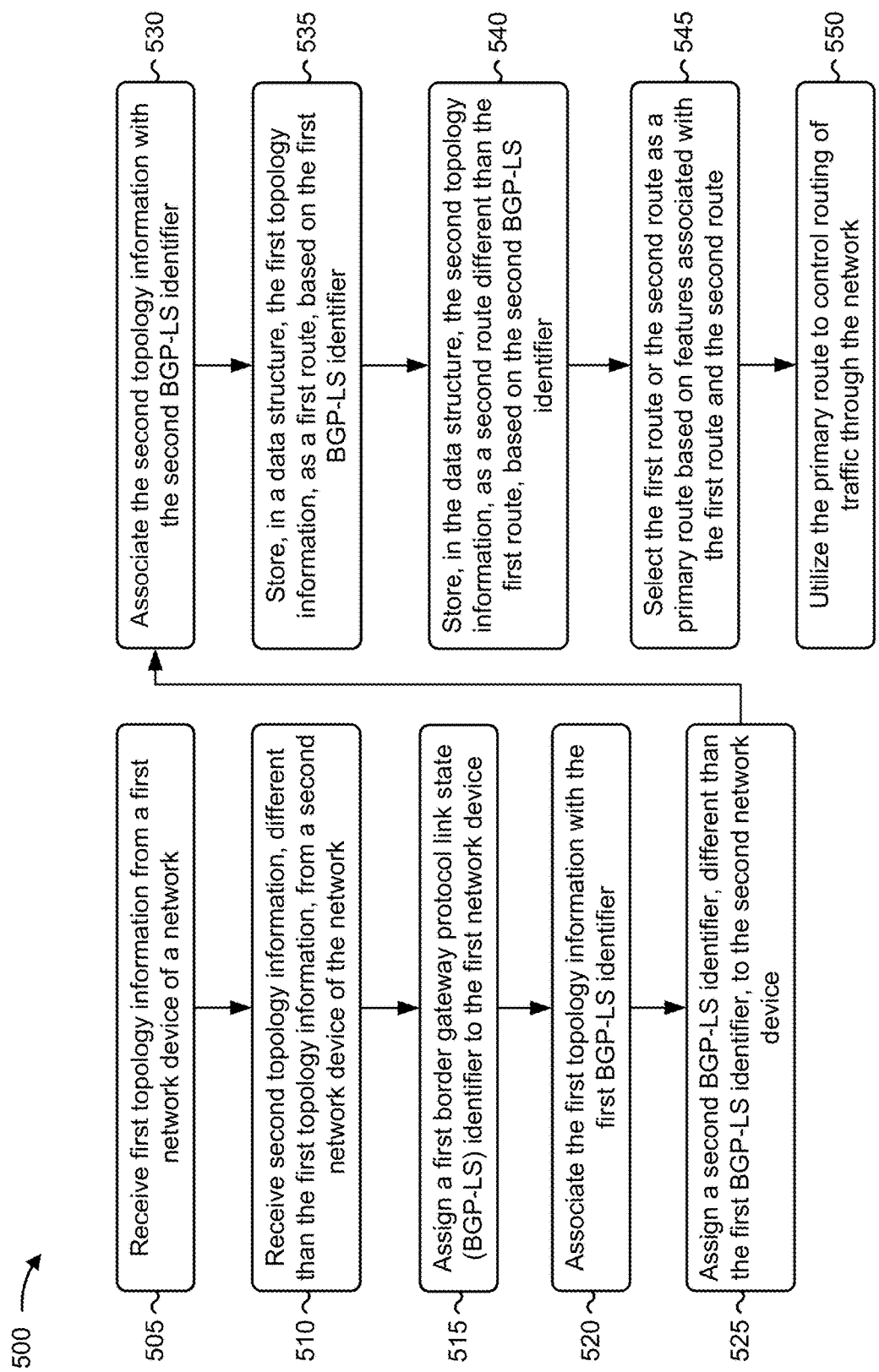
FIG. 5 is a flowchart of an example process for preserving consistency of redundant BGP-LS topology information.

FIG. 5 is a flowchart of an example process 500 for preserving consistency of redundant BGP-LS topology information. In some implementations, one or more process blocks of FIG. 5 may be performed by a device (e.g., the network controller 210). In some implementations, one or more process blocks of FIG. 5 may be performed by another device or a group of devices separate from or including the device, such as a network device (e.g., the network device 220). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving first topology information from a first network device of a network (block 505). For example, the device may receive first topology information from a first network device of a network, as described above. In some implementations, the device includes a network controller or a path computation element.

As further shown in FIG. 5, process 500 may include receiving second topology information, different than the first topology information, from a second network device of the network (block 510). For example, the device may receive second topology information, different than the first topology information, from a second network device of the network, as described above. In some implementations, the device is a BGP consumer and each of the first network device and the second network device is a BGP originator.

As further shown in FIG. 5, process 500 may include assigning a first BGP-LS identifier to the first network device (block 515). For example, the device may assign a first BGP-LS identifier to the first network device, as described above. In some implementations, the first BGP-LS identifier is part of network layer reachability information, and the first BGP-LS identifier is associated with the first route, based on the first BGP-LS identifier being part of the network layer reachability information.

As further shown in FIG. 5, process 500 may include associating the first topology information with the first BGP-LS identifier (block 520). For example, the device may associate the first topology information with the first BGP-LS identifier, as described above.

As further shown in FIG. 5, process 500 may include assigning a second BGP-LS identifier, different than the first BGP-LS identifier, to the second network device (block 525). For example, the device may assign a second BGP-LS identifier, different than the first BGP-LS identifier, to the second network device, as described above. In some implementations, the second BGP-LS identifier is part of network layer reachability information, and the second BGP-LS identifier is associated with the second route based on the second BGP-LS identifier being part of the network layer reachability information. In some implementations, the first BGP-LS identifier identifies a source of the first topology information and the second BGP-LS identifier identifies a source of the second topology information. In some implementations, the first BGP-LS identifier includes a first value, and the second BGP-LS identifier includes a second value that is different than the first value.

As further shown in FIG. 5, process 500 may include associating the second topology information with the second BGP-LS identifier (block 530). For example, the device may associate the second topology information with the second BGP-LS identifier, as described above.

As further shown in FIG. 5, process 500 may include storing, in a data structure, the first topology information, as a first route, based on the first BGP-LS identifier (block 535). For example, the device may store, in a data structure, the first topology information, as a first route, based on the first BGP-LS identifier, as described above. In some implementations, the data structure includes a traffic engineering database.

As further shown in FIG. 5, process 500 may include storing, in the data structure, the second topology information, as a second route different than the first route, based on the second BGP-LS identifier (block 540). For example, the device may store, in the data structure, the second topology information, as a second route different than the first route, based on the second BGP-LS identifier, as described above.

As further shown in FIG. 5, process 500 may include selecting the first route or the second route as a primary route based on features associated with the first route and the second route (block 545). For example, the device may select the first route or the second route as a primary route based on features associated with the first route and the second route, as described above. In some implementations, the features associated with the first route and the second route include data identifying one or more of a first distance between the device and the first network device, a second distance between the device and the second network device, an age of the first route, an age of the second route, a credibility of the first network device, or a credibility of the second network device. In some implementations, selecting the first route or the second route as the primary route based on the features associated with the first route and the second route includes selecting the first route or the second route as the primary route based on convergence times associated with the first route and the second route.

As further shown in FIG. 5, process 500 may include utilizing the primary route to control routing of traffic through the network (block 550). For example, the device may utilize the primary route to control routing of traffic through the network, as described above. In some implementations, utilizing the primary route to control the routing of the traffic through the network includes one of providing the first topology information to the network to cause the network to route the traffic through the network via the first route, or providing the second topology information to the network to cause the network to route the traffic through the network via the second route.

In some implementations, process 500 includes providing, to a peer device, the first topology information or the second topology information, based on whether the first route or the second route is selected as the primary route, to cause the peer device to utilize the first topology information or the second topology information to control routing of traffic through the network.

In some implementations, process 500 includes executing a configuration to cause the device to assign the first BGP-LS identifier to the first network device and to assign the second BGP-LS identifier, different than the first BGP-LS identifier, to the second network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, first topology information from a first network device of a network;
   receiving, by the device, second topology information, different than the first topology information, from a second network device of the network;
   assigning, by the device, a first border gateway protocol link state (BGP-LS) identifier to the first network device;
   associating, by the device, the first topology information with the first BGP-LS identifier;
   assigning, by the device, a second BGP-LS identifier, different than the first BGP-LS identifier, to the second network device,
      wherein assigning the second BGP-LS identifier comprises:
         executing a configuration to cause the device to assign the second BGP-LS identifier, different than the first BGP-LS identifier, to the second network device,
            wherein the first BGP-LS identifier and second BGP-LS identifier each refer to network devices in a same network domain;
   associating, by the device, the second topology information with the second BGP-LS identifier;
   storing, by the device and in a data structure, the first topology information, as a first route, based on the first BGP-LS identifier;
   storing, by the device and in the data structure, the second topology information, as a second route different than the first route, based on the second BGP-LS identifier;
   selecting, by the device, the first route or the second route as a primary route based on features associated with the first route and the second route; and
   utilizing, by the device, the primary route to control routing of traffic through the network.

2. The method of claim 1, further comprising:
   providing, to a peer device, the first topology information or the second topology information, based on whether the first route or the second route is selected as the primary route, to cause the peer device to utilize the first topology information or the second topology information to control routing of traffic through the network.

3. The method of claim 1, wherein since the first BGP-LS identifier is part of network layer reachability information, and wherein the first BGP-LS identifier is associated with the first route, based on the first BGP-LS identifier being part of the network layer reachability information.

4. The method of claim 1, wherein since the second BGP-LS identifier is part of network layer reachability information, and wherein the second BGP-LS identifier is associated with the second route based on the second BGP-LS identifier being part of the network layer reachability information.

5. The method of claim 1, wherein the first BGP-LS identifier identifies a source of the first topology information and the second BGP-LS identifier identifies a source of the second topology information.

6. The method of claim 1, wherein the data structure includes a traffic engineering database.

7. The method of claim 1, wherein the features associated with the first route and the second route include data identifying one or more of:
   a first distance between the device and the first network device,
   a second distance between the device and the second network device,
   an age of the first route,
   an age of the second route,
   a credibility of the first network device, or
   a credibility of the second network device.

8. A device, comprising:
   one or more memories; and
   one or more processors to:
      receive first topology information from a first network device of a network;
      receive second topology information, different than the first topology information, from a second network device of the network;
      assign a first border gateway protocol link state (BGP-LS) identifier to the first network device;
      associate the first topology information with the first BGP-LS identifier;
      assign a second BGP-LS identifier, different than the first BGP-LS identifier, to the second network device,
         wherein the one or more processors to assign the second BGP-LS identifier, are to:
            execute a configuration to cause the device to assign the second BGP-LS identifier, different than the first BGP-LS identifier, to the second network device,
               wherein the first BGP-LS identifier and second BGP-LS identifier each refer to network devices in a same network domain;
      associate the second topology information with the second BGP-LS identifier;
      store, in a data structure, the first topology information, as a first route, based on the first BGP-LS identifier;
      store, in the data structure, the second topology information, as a second route different than the first route, based on the second BGP-LS identifier;
      select the first route or the second route as a primary route based on features associated with the first route and the second route,
         wherein the features associated with the first route and the second route include data identifying one or more of:
            a first distance between the device and the first network device,
            a second distance between the device and the second network device,
            an age of the first route,
            an age of the second route,
            a credibility of the first network device, or
            a credibility of the second network device; and
      utilize the primary route to control routing of traffic through the network.

9. The device of claim 8, wherein the device is a BGP consumer and each of the first network device and the second network device is a BGP originator.

10. The device of claim 8, wherein the one or more processors, to utilize the primary route to control the routing of the traffic through the network, are to:
    provide the first topology information to the network to cause the network to route the traffic through the network via the first route; or
    provide the second topology information to the network to cause the network to route the traffic through the network via the second route.

11. The device of claim 8, wherein the device includes a network controller or a path computation element.

12. The device of claim 8, wherein the first BGP-LS identifier includes a first value, and the second BGP-LS identifier includes a second value that is different than the first value.

13. The device of claim 8, wherein the one or more processors, to select the first route or the second route as the primary route based on the features associated with the first route and the second route, are to:
 select the first route or the second route as the primary route based on convergence times associated with the first route and the second route.

14. The device of claim 8, wherein the one or more processors are further to:
 provide, to a peer device, the first topology information or the second topology information, based on whether the first route or the second route is selected as the primary route, to cause the peer device to utilize the first topology information or the second topology information to control routing of traffic through the network.

15. A non-transitory computer-readable medium storing a set of instructions, the set of instructions comprising:
 one or more instructions that, when executed by one or more processors of a device, cause the device to:
  receive first topology information from a first network device of a network;
  receive second topology information, different than the first topology information, from a second network device of the network;
  assign a first border gateway protocol link state (BGP-LS) identifier to the first network device;
  associate the first topology information with the first BGP-LS identifier;
  assign a second BGP-LS identifier, different than the first BGP-LS identifier, to the second network device,
   wherein the one or more instructions, that cause the device to assign the second BGP-LS identifier, cause the device to one of:
    execute a configuration to cause the device to assign the second BGP-LS identifier, different than the first BGP-LS identifier, to the second network device,
     wherein the first BGP-LS identifier and second BGP-LS identifier each refer to network devices in a same network domain;
  associate the second topology information with the second BGP-LS identifier;
  store, in a data structure, the first topology information, as a first route, based on the first BGP-LS identifier;
  store, in the data structure, the second topology information, as a second route different than the first route, based on the second BGP-LS identifier;
  select the first route or the second route as a primary route based on features associated with the first route and the second route;
  utilize the primary route to control routing of traffic through the network; and
  provide, to a peer device, the first topology information or the second topology information, based on whether the first route or the second route is selected as the primary route, to cause the peer device to utilize the first topology information or the second topology information to control routing of traffic through the network.

16. The non-transitory computer-readable medium of claim 15, wherein the first BGP-LS identifier identifies a source of the first topology information and the second BGP-LS identifier identifies a source of the second topology information.

17. The non-transitory computer-readable medium of claim 15, wherein the one or more instructions, that cause the device to utilize the primary route to control the routing of the traffic through the network, cause the device to one of:
 provide the first topology information to the network to cause the network to route the traffic through the network via the first route; or
 provide the second topology information to the network to cause the network to route the traffic through the network via the second route.

18. The non-transitory computer-readable medium of claim 15, wherein the first BGP-LS identifier includes a first value, and the second BGP-LS identifier includes a second value that is different than the first value.

19. The non-transitory computer-readable medium of claim 15, wherein the one or more instructions, that cause the device to select the first route or the second route as the primary route based on the features associated with the first route and the second route, cause the device to:
 select the first route or the second route as the primary route based on convergence times associated with the first route and the second route.

20. The non-transitory computer-readable medium of claim 15, wherein the device is a BGP consumer and each of the first network device and the second network device is a BGP originator.

* * * * *